(12) United States Patent
Makrehchi et al.

(10) Patent No.: US 12,488,260 B2
(45) Date of Patent: Dec. 2, 2025

(54) SYSTEMS AND METHODS FOR ACTIVE CURRICULUM LEARNING

(71) Applicant: Thomson Reuters Enterprise Centre GmbH, Zug (CH)

(72) Inventors: Masoud Makrehchi, Markham (CA); Borna Jafarpour, North York (CA); Nicolai Pogrebnyakov, Burlington (CA); Firoozeh Sepehr, Toronto (CA); Vinod Vijaykumar Madyalkar, Toronto (CA); Seung Min Lee, Gangwon-do (KR)

(73) Assignee: Thomson Reuters Enterprise Centre GmbH, Zug (CH)

( * ) Notice: Subject to any disclaimer, the term of this patent is extended or adjusted under 35 U.S.C. 154(b) by 854 days.

(21) Appl. No.: 17/738,057

(22) Filed: May 6, 2022

(65) Prior Publication Data

US 2022/0366282 A1  Nov. 17, 2022

Related U.S. Application Data

(60) Provisional application No. 63/185,010, filed on May 6, 2021.

(51) Int. Cl.
*G06N 5/046* (2023.01)
*G06F 16/334* (2025.01)
(Continued)

(52) U.S. Cl.
CPC ........... *G06N 5/046* (2013.01); *G06F 40/211* (2020.01); *G06N 20/00* (2019.01);
(Continued)

(58) Field of Classification Search
CPC ........ G06N 5/046; G06N 20/00; G06N 5/022; G06N 5/025; G06N 20/20; G06N 40/30;
(Continued)

(56) References Cited

U.S. PATENT DOCUMENTS

2023/0077990 A1\*  3/2023  Luo .................. G06N 20/00
706/12

OTHER PUBLICATIONS

Namit Katariya et al ("Active Evaluation of Classifiers on Large Datasets" Published 2012 (Total 10 pages) (Year: 2012).\*
(Continued)

*Primary Examiner* — Quoc A Tran
(74) *Attorney, Agent, or Firm* — Nikitas E. Nicolakis; Lombard Geliebter Cohen LLP (57) ABSTRACT

Computer systems and computer implemented methods for training a machine learning model are provided that includes: selecting seed data from an unlabeled dataset; labeling the seed data and storing the labeled seed data in a data store; training the machine learning model in an initial iteration using the labeled seed data, where the machine learning model is trained to select a next subset of the unlabeled dataset; selecting a next subset of the unlabeled dataset; computing difficulty scores for at least the next subset of the unlabeled dataset; labeling the next subset of the unlabeled data; and training the machine learning model in a second iteration using the labeled next subset of the unlabeled dataset. The machine learning model is generally trained to select the next subset of the unlabeled dataset for a subsequent training iteration by presenting the labeled next subset of the unlabeled dataset in an order sorted based on the difficulty scores.

20 Claims, 6 Drawing Sheets

(51) Int. Cl.
  *G06F 16/35* (2025.01)
  *G06F 40/211* (2020.01)
  *G06N 3/09* (2023.01)
  *G06N 3/091* (2023.01)
  *G06N 5/022* (2023.01)
  *G06N 5/025* (2023.01)
  *G06N 20/00* (2019.01)
  *G06N 20/20* (2019.01)

(52) U.S. Cl.
  CPC .......... *G06F 16/3344* (2019.01); *G06F 16/35* (2019.01); *G06N 3/09* (2023.01); *G06N 3/091* (2023.01); *G06N 5/022* (2013.01); *G06N 5/025* (2013.01); *G06N 20/20* (2019.01)

(58) Field of Classification Search
  CPC ........ G06N 3/09; G06N 3/091; G06F 40/211; G06F 16/35; G06F 16/3344; G06F 16/6646
  See application file for complete search history.

(56) References Cited

OTHER PUBLICATIONS

PCT International Search Report and Written Opinion for International Application No. PCT/IB2022/054239, Aug. 19, 2022, 10 pages.
Chi, F. C. (2015). ActiveCrowd: integrating active learning with Amazon Mechanical Turk (Outstanding Academic Papers by Students (OAPS)). Retrieved from City University of Hong Kong, CityU Institutional Repository. 116 pages.

* cited by examiner

SYSTEMS AND METHODS FOR ACTIVE CURRICULUM LEARNING

RELATED APPLICATION

This application claims the benefit of U.S. Provisional Patent Application No. 63/185,010, filed on May 6, 2021, which is hereby incorporate herein by reference.

COPYRIGHT NOTICE

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The present application relates to machine learning models, and more particularly improved systems and methods for training machine learning models, as well as exemplary uses thereof.

Modern deep learning architectures require a large amount of labeled data to achieve high levels of performance. In the presence of a large unlabeled corpus, data points to be annotated are usually chosen randomly. That is, traditional machine learning involves iteratively selecting at random and then labeling the selected data, training a model with the labeled data, evaluating the model, and stopping when satisfactory results are achieved. Random data sampling, however, may require a relatively large amount of labeling to achieve the desired performance. Accordingly, there is a need for improved systems and methods for training machine learning models that are not so limited.

SUMMARY

In one aspect, a computer implemented method for training a machine learning model is provided that includes: selecting seed data from an unlabeled dataset, wherein the seed data comprises a subset of the unlabeled dataset; labeling the seed data and storing the labeled seed data in a data store; training the machine learning model in an initial iteration using the labeled seed data, wherein the machine learning model is trained to select a next subset of the unlabeled dataset; selecting by the machine learning model a next subset of the unlabeled dataset; computing difficulty scores for at least the next subset of the unlabeled dataset; labeling the next subset of the unlabeled data; and training the machine learning model in a second iteration using the labeled next subset of the unlabeled dataset, wherein the machine learning model is trained to select the next subset of the unlabeled dataset for a subsequent training iteration by presenting the labeled next subset of the unlabeled dataset in an order sorted based on the difficulty scores.

In one embodiment, the difficulty scores are computed based on a curriculum learning metric.

In one embodiment, the difficulty scores are computed further based on active learning metric.

In one embodiment, active learning metric comprises a variable indicating the informativeness of a given data item.

In one embodiment, active learning criteria comprises a variable indicating the uncertainty of label prediction for a given data item.

In one embodiment, the labeled dataset includes a plurality of sentences and wherein curriculum learning criteria includes at least one of: an average of a number of children of words in a sentence parse tree, a sentence score according to the GPT2 language model, and average loss of words in a sentence according to the Longformer language model.

In one embodiment, the labeled dataset includes a plurality of sentences, at least one word in each of a plurality of sentences is replaced with its linguistic feature, and wherein curriculum learning criteria includes at least one of: simple universal part-of-speech tag, detailed part-of-speech tag, shape of the word, and syntactic relation connecting a child to a head in a dependency parsing tree of the given sentence.

In one embodiment, the difficulty scores are computed based on a linear combination of the curriculum metric and an active learning metric.

In one aspect, a computer system is provided that includes at least one server computer coupled over a computer network to at least one client device, the at least one server configured to: receive labeled seed data from an unlabeled dataset and storing the labeled seed data in a data store, wherein the labeled seed data comprises a subset of the unlabeled dataset; train the machine learning model in an initial iteration using the labeled seed data, wherein the machine learning model is trained to select a next subset of the unlabeled dataset; select by the machine learning model a next subset of the unlabeled dataset; compute difficulty scores for at least the next subset of the unlabeled dataset; receive the next subset of the unlabeled data labeled; and train the machine learning model in a second iteration using the labeled next subset of the unlabeled dataset, wherein the machine learning model is trained to select the next subset of the unlabeled dataset for a subsequent training iteration by presenting the labeled next subset of the unlabeled dataset in an order sorted based on the difficulty scores.

In one embodiment, the difficulty scores are computed based on a curriculum learning metric.

In one embodiment, the difficulty scores are computed further based on active learning metric.

In one embodiment, active learning metric comprises a variable indicating the informativeness of a given data item.

In one embodiment, active learning criteria comprises a variable indicating the uncertainty of label prediction for a given data item.

In one embodiment, the labeled dataset includes a plurality of sentences and wherein curriculum learning criteria includes at least one of: an average of a number of children of words in a sentence parse tree, a sentence score according to the GPT2 language model, and average loss of words in a sentence according to the Longformer language model.

In one embodiment, the labeled dataset includes a plurality of sentences, at least one word in each of a plurality of sentences is replaced with its linguistic feature, and wherein curriculum learning criteria incudes at least one of: simple universal part-of-speech tag, detailed part-of-speech tag, shape of the word, and syntactic relation connecting a child to a head in a dependency parsing tree of the given sentence.

In one embodiment, the difficulty scores are computed based on a linear combination of the curriculum metric and an active learning metric.

In one embodiment, the at least one server configured to: store unlabeled data, labeled data, and the machine learning model in a remote data store, for each iteration, download the unlabeled data, the labeled data, and the machine learning model for training, and upon completion of training, upload resulting unlabeled data, labeled data, and the trained machine learning model to the data store.

In one embodiment, the at least one server configured: to communicate the next subset of the unlabeled dataset to an annotation service, check annotation status, and retrieve from the annotation services the labeled next subset of the unlabeled dataset.

In one embodiment, wherein the system comprises a workflow component that controls training of the machine learning model and a web service component that comprises at least one service that picks a file from the datastore containing data to be annotated, post the data to be annotated as tasks in the annotation service, check annotation status, and read tasks from the annotation service.

In one embodiment, the at least one service further converts the tasks from the annotation service to annotated data dataframes for the workflow component to read the annotated data dataframes for iterative training of the machine learning model.

Additional aspects of the present invention will be apparent in view of the description which follows.

DETAILED DESCRIPTION

As discussed above, certain machine learning architectures require a large amount of labeled data to achieve acceptable levels of performance, but the process for choosing these data points (such as documents, sentences, phrases, images, etc.) for labeling from a corpus of unlabeled data can be costly. The present application provides improved systems and methods for training machine learning models, including with respect to lowering annotation cost, providing smaller models and/or with higher metrics and less data/effort, lowering storage/computational needs, and/or lowering the time necessary to create products using such models.

Although the present application may be discussed in relation to certain types of uses, such as training models for selecting data points for annotation and specific uses thereof, it is understood that the novel concepts disclosed herein are applicable to other uses and applications, and the embodiments disclosed herein are therefore not limiting.

Figure 1:
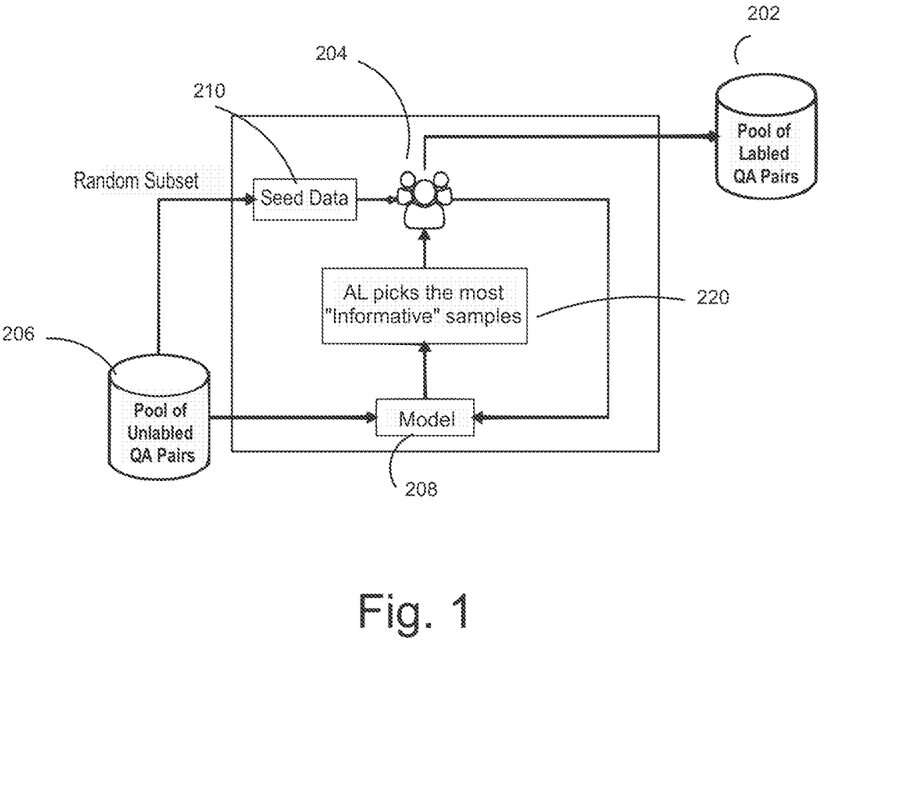
FIG. 1 is a block diagram depicting flow of data for training a machine learning model in an active learning environment according to at least one embodiment of the methods and systems disclosed herein.

Active Learning (AL) may be used to reduce the number of annotations required to train a machine learning model, generally, by choosing the most "informative" unlabeled data for annotation. As shown in the information flow diagram FIG. 1, for example, active learning involves selecting "seed" data 210 from a database of unlabeled data 206, e.g., unlabeled question and answer (QA) pairs. Seed data 210 is generally a relatively small subset of the unlabeled data set 206, which may be selected using any suitable technique, including randomly selecting the seed data. The seed data 210 may then be provided to (human or machine) annotator(s) 204 for labeling. The labeled seed data may then be stored in a database of labeled data 202, e.g., labeled QA pairs, which may be used to train the model 208 (as well as to train other models). Preferably, the labeled data 202 is used to train the model 208 to pick for annotation the next set of data points from the unlabeled data 206 for annotation, for example, the next most "informative" subset of unlabeled data. The trained model 208 may then pick the next subset of data, which is provided to the annotator(s) 204 for labeling. Once labeled, this next subset of data is stored and used to train/fine tune the model 208. This loop is repeated until desired performance levels of the model 208 or number of iterations are achieved.

The "informativeness" of the data may be determined by querying a model or a set of models. Algorithm 1, below, shows an AL algorithm more formally. Examples of stopping criteria are a fixed number of iterations or reaching a prespecified annotation budget.

---
Algorithm 1: Active Learning algorithm where
L(I) denotes the set I after annotation.

1. Seed labeled data $D^L = \{(x_1, y_1), ..., (x_k, y_k)\}$
2. Unbaled data $D^U = \{x_{k+1}, ..., x_m\}$
3. While the stopping criterion is not met:
   3.1. Fine-tune or Train model M on $D^L$
   3.2. I := i most informative data samples in $D^U$ according to M
   3.3. $D^U := D^U / I$
   3.4. $D^L := D^L \cup L(I)$

---

Several categories of informativeness scores (generally AL score(s)) may be used. For example, uncertainty metrics may be used to select unlabeled data for which the model has the highest uncertainty of label prediction. The assumption is that an unlabeled data point is informative if the machine learning model trained on the labeled data is not certain about its predicted label. This means that unlabeled data point is close to the decision boundary and knowing its label will help the model to draw that boundary more accurately. Two examples of uncertainty measures are the difference of probability of prediction for the first and second most likely classes (i.e., the margin of prediction probability) or entropy of prediction over all classes (i.e., $-\Sigma_1^n p_i \log p_i$). Lower values of margin and higher values of entropy metrics are associated with higher uncertainty and informativeness. Another informativeness metric may be the disagreement in a committee, where an ensemble of models is trained and the extent to which they disagree about the class labels of unlabeled data serves as the selection criterion. The theory behind this approach is that if multiple models are trained on the same dataset "disagree" on the label of an unlabeled data point, that data point is considered informative because it is positioned in a "difficult" region of the decision space. Yet another sampling approach focuses on selecting examples that would result in the largest change to a component of the active learner model (e.g., the embedding layer weights).

Curriculum Learning (CL), on the other hand, attempts to mimic human learning and uses that knowledge to help a model learn. Complex topics are taught to humans based on a curriculum which takes into account the level of difficulty of the material presented to the learners. CL borrows this idea, and human experts design a metric that is used to sort training data (all annotated) from "easy" to "hard" to be presented to the model during training. Algorithm 2 shows curriculum learning more formally.

| Algorithm 2: Curriculum Learning Algorithm. |
| --- |
| 1. Training data $D^T = \{\}$ |
| 2. Future training data $D^F = \{(x_l, y_l), ..., (x_m, y_m)\}$ |
| 3. Continue until $D^F$ is empty: |
|     3.1. $E = K$ easiest examples in $D^F$ according to $\alpha$ fixed curriculum |
|     3.2. $D^F = D^F - E$ |
|     3.3. $D^T = D^T + E$ |
|     3.4. Fine-tune existing model M on $D^T$ |

This approach has been investigated in computer vision, Natural Language Processing (NLP), and speech recognition. Specifically, within NLP, CL has been used on tasks such as question answering, natural language understanding, and learning word representations. The effectiveness of different curriculum designs has been investigated considering heuristics, such as sentence length, word frequency, language model score, and parse tree depth. Related approaches such as self-paced learning and self-paced curriculum learning have also been proposed to show the efficacy of a designed curriculum which adapts dynamically to the pace at which the learner progresses. Attempts at improving an AL strategy include self-paced active learning in which practical techniques are introduced to consider informativeness, representativeness, and easiness of samples while querying for labels. Such methods that only focus on designing a curriculum miss, in general, the opportunity to also leverage the ability of the predictive model which progresses as new labeled data becomes available.

Applicants provide herein a novel method for training machine learning models, which takes advantage of the benefits of both AL (i.e., choosing samples based on the improved ability of the predictive model) and CL (i.e., designing a curriculum for the model to learn) at the same time. Our contributions in this application are twofold: (i) we shed light on the relationship between AL and CL by investigating how AL enforces a curriculum by monitoring and visualizing a variety of potential novel curricula during AL; and (ii) we manipulate the curricula of AL during training so that it benefits from both the dynamic nature of AL as well as the experts' knowledge of difficulty of the training examples. Our experiments show that AL training techniques may be improved by combining the AL and CL training concepts.

Other than the most explored curriculum features, such as sentence length and word frequency, some other curricula for measuring diversity, simplicity, and prototypicality of the samples have been proposed. Large-scale language models and linguistic features can be used to design NLP curricula. We designed 7 novel curricula which assign a score to a sentence indicating its difficulty for an NLP task. To acquire a curriculum, sentences are sorted by their corresponding (CL) scores. We experimented with the following curricula:

1. SENT_LEN: Number of words in a sentence.
2. WORD_FREQ: Average of frequency of the words in a sentence. For example, frequency of the word A is calculated by $$\frac{N_A}{\sum_{w \in V} N_w}$$

where V is the set of the unique vocabulary of the labeled dataset, and $N_w$ is the number of times the word w has appeared in the labeled dataset.

We also propose the following 7 novel curricula:

3. PARSE_CHILD Average of the number of children of words in the sentence parse tree.
4. GPT_SCORE Sentence score according to the GPT2 language model calculated as follows: $\Sigma \log(p(w_k))$ where $p(w_k)$ is the probability of $k^{th}$ word of the sentence according to the GPT2 model.
5. LL_LOSS: Average loss of the words in a sentence according to the Longformer language model.

For the following 4 curricula, we use the spaCy library to replace a word in a sentence with one of its linguistic features. The curriculum value for a sentence is then calculated exactly in the same way as word frequency but with one of the linguistic features instead of the word itself:

6. POS: Simple universal part-of-speech tag such as PROPN, AUX or VERB;
7. TAG: Detailed part-of-speech tag such as NNP, VBZ, VBG;
8. SHAPE: Shape of the word (e.g., the shapes of the words "Apple" and "12a." are "Xxxxx" and "ddx.", respectively);
9. DEP: Syntactic relation connecting the child to the head in the dependency parsing tree of the sentence (e.g., amod, and compound).

In our experiments, we attempted to answer: what is the relationship between active learning and curriculum learning from the lens of 9 curricula?

We simulated 2 AL strategies and a random strategy, and monitored the curriculum metrics on the most informative samples chosen by the active learner model from the unlabeled data for annotation and randomly chosen data and compared them. In our simulations, we started with seed data of 500 randomly selected sentences and in 15 iterations we added 500 more sentences. We used the following two informativeness measures for unlabeled sentences in our AL simulations: (i) min-margin: minimum of margin of prediction for the tokens of the sentence is the AL score for that sentence (sentences with lower scores are preferred), and (ii) max-entropy: maximum of entropy of prediction for the tokens of the sentence is the AL score for that sentence (sentences with higher scores are preferred). For our model, we used a single layer Bi-LSTM model with the hidden size of 768, enhanced with a 2-layer feed-forward network with the number of hidden and output layers' nodes are equal to the number of classes in the dataset. This model was optimized with ADAM optimizer with batch size of 64 and learning rate of 5e-4. We experimented with two publicly available Named Entity Recognition (NER) datasets: OntoNotes5 and CoNLL 2003. We used early stopping on loss of the validation sets provided by OntoNotes5, and CoNLL 2003. For PD, we use 80%-10%-10% random split for train, test and validation sets.

Figure 2:
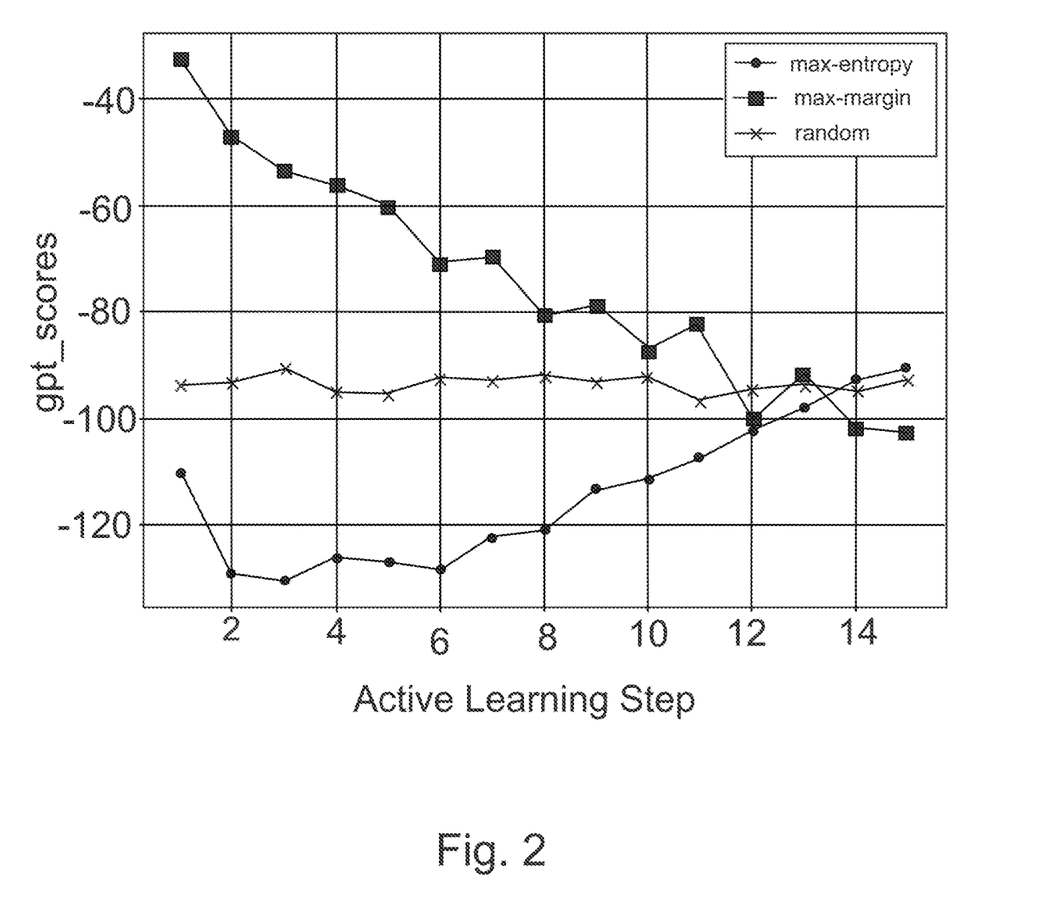
FIG. 2 depicts a graph comparing the mean Generative Pre-trained Transformer (GPT) score of sentences added to training data in each iteration of an active learning loop between random, max-margin, and max-entropy for the CoNLL dataset.

FIG. 2 shows Comparison of mean of Generative Pre-trained Transformer (GPT) score of sentences added to training data in each iteration between random, max-margin and max-entropy for the CoNLL dataset (average of 3 runs). It can be seen that GPT score of sentences chosen by max-entropy tends to have lower GPT score (more complex sentences) and max-margin tends to choose sentences with low GPT score (simpler sentences) compared to a random strategy. Similar figures for other curricula reveal peculiarities of the different AL strategies compared to random strategy. We calculated the following Normalized Mean Difference (NMD) metric to quantify how different an active learner is in choosing the most informative unlabeled data compared to random strategy for a curriculum of interest:

$$\sum_{i=1}^{n} \sum_{j=1}^{k} \frac{N(\psi^{CL}(RN_{ij})) - N(\psi^{CL}(AL_{ij}))}{n \times k}$$

where n is the number of times we add k new labeled sentences to our seed dataset in each step, $\psi^{cl}$ function calculates the value of the curriculum feature for a sentence, $RN_{ij}$ and $AL_{ij}$ are the $j^{th}$ and sentence out of k added to the $i^{th}$ step of the random and active strategies, respectively, $$N(x) := \frac{x - r_{min}^{CL}}{r_{max}^{CL} - r_{min}^{CL}}, \; r_{min}^{CL} := \min_{i \in [i,n]} \sum_{j=1}^{k} \psi^{CL}(RN_{ij})/k,$$

$$\text{and } r_{max}^{CL} := \max_{i \in [i,n]} \sum_{j=1}^{k} \psi^{CL}(RN_{ij})/k.$$

Observe that the NMD metric shows the difference between the average of the curriculum metric values of sentences added to the labeled data. The results for max-margin and max-entropy are reported in Table 1.

TABLE 1

Normalized Mean Difference of max-margin and max-entropy for the two datasets CoNLL and OntoNotes5.

|  | CoNLL | | OntoNotes5 | |
| --- | --- | --- | --- | --- |
|  | Max-Margin | Max-Entropy | Max-Margin | Max-Entropy |
| DEP | −16.7 | 2 | −66.3 | −5.5 |
| POS | −18.2 | −0.1 | −4.2 | −5.9 |
| SHAPE | 4.1 | −3 | 12.5 | 4.7 |
| TAG | −14.3 | 0.3 | −4.3 | −8.7 |
| gpt_score | −3.3 | 3.5 | −9 | 6.3 |
| ll_loss | −1.5 | 1.1 | −18.1 | 1.7 |
| parse_child | 3.1 | −1.7 | 18.1 | −0.9 |
| sent_len | 4.7 | −3.9 | 10.7 | −6.2 |
| word_freq | 1.9 | −2.4 | −0.7 | −0.1 |

To improve the performance of the AL, we introduced an effective method leveraging both advantages of AL and CL, which we call Active Curriculum Learning (ACL). The goal of this proposed method is to benefit from the dynamic nature of AL data selection metric while utilizing experts' knowledge in designing a fixed curriculum. To this end, in each step of the AL loop, instead of using AL score of unlabeled sentences, we use a linear combination of AL and CL scores, i.e., the ACL score, to choose the most informative unlabeled data:

$$\psi^{ACL}(s, M_i) := \alpha \frac{\psi^{CL}(s)}{\max_{s \in D_i^U} |\psi^{CL}(s)|} + \beta \frac{\psi^{AL}(s, M_i)}{\max_{s \in D_i^U} |\psi^{AL}(s, M_i)|}$$

where $D_i^U$ is the set of unlabeled sentences in step i of the AL loop, $\alpha$ and $\beta$ are the two parameters that control the weight of AL and CL scores, $\psi^{AL}(s, M_i)$ is the AL score (i.e., informativeness) of sentence s according to the active learner model $M_i$ trained on $D_i^L$ at iteration i. The overall steps of the ACL according to a preferred embodiment are presented in Algorithm 3.

Algorithm 3: Active Curriculum Learning Algorithm.

1. Labeled training data $D^L = \{ \}$
2. Unlabeled data $D^U = \{(x_1, y_1), ..., (x_m, y_m)\}$
3. While the stopping criteria is not met:
   3.1. E := k examples in $D^U$ with the lowest score $\psi^{ACL}$
   3.2. $D^L := D^L \setminus E$
   3.3. $D^U := D^U \cup E$
   3.4. Fine-tune existing model M on $D^L$ We used the simulation setup mentioned above and performed token classification on CoNLL and OntoNotes5. In step i of the AL loop, we measured the F1 measure of the trained model in that step. To maintain a higher granularity of the scores we reported the token-level F1 measures on the test set. In min-margin strategy, sentences with lower ACL score are more informative and the opposite is true for max-entropy. To combine AL and CL we ran experiments with $\alpha=1$, $\beta=\pm 0.5$. Results of these experiments can be seen in Table 2.

TABLE 2

ACL results for Proprietary Dataset OntoNotes5, and CoNLL datasets (cm: curriculum steps metric, Fl: average of F1 score across all 15 and 3 runs, $\alpha = 1$ for all experiments).

| | Max-margin | | Max-Entropy | | |
| --- | --- | --- | --- | --- | --- |
| metric | β | F1 | CM | β | F1 |
| | | OntoNotes5 | | | |
| gpt_score | 0.5 | 0.4 | ll_loss | −0.5 | 0.48 |
| parse_child | −0.5 | 0.4 | DEP | −0.5 | 0.45 |
| sent_len | −0.5 | 0.38 | POS | −0.5 | 0.43 |
| ll_loss | 0.5 | 0.37 | word_freq | −0.5 | 0.43 |
| TAG | −0.5 | 0.33 | sent_len | −0.5 | 0.43 |
| — | 0 | 0.23 | | 0 | 0.36 |
| | | CoNLL | | | |
| ll_loss | 0.5 | 0.65 | sent_len | 0.5 | 0.67 |
| gpt_score | 0.5 | 0.63 | ll_loss | 0.5 | 0.66 |
| parse_child | −0.5 | 0.63 | word_freq | −0.5 | 0.66 |
| sent_len | −0.5 | 0.62 | parse_child | 0.5 | 0.66 |
| DEP | 0.5 | 0.61 | gpt_score | −0.5 | 0.66 |
| — | 0 | 0.57 | | 0 | 0.64 |

Our experiments with two public NER datasets and a proprietary dataset and 9 curricula show that AL follows multiple curricula. Our experiments in the tables above also show that AL can be enhanced with human designed curricula. This takes advantage of benefits of both CL (i.e., designing a curriculum for the model to learn) and AL (i.e., choosing samples based on the improved ability of the predictive model) to improve AL in a unified model.

Figure 3:
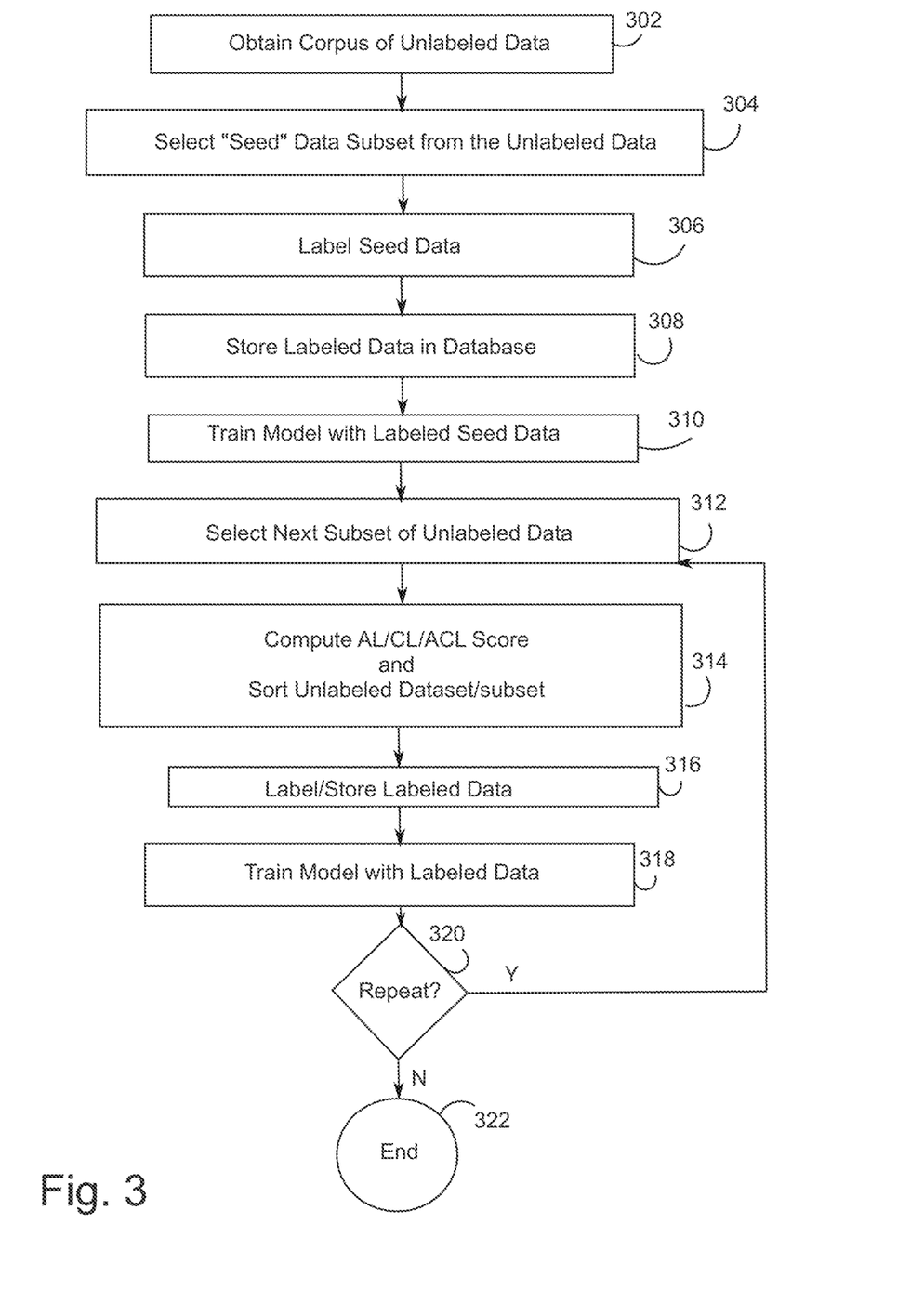
FIG. 3 depicts an exemplary architecture for use in training a machine learning model in an active learning environment.

Referring to FIG. 3, an exemplary architecture for training a machine learning model as discussed herein is provided. This architecture generally has three components: workflow, data store, and web services (WS), such as Amazon® web services (AWS). The workflow component defines and performs the distinct steps involved in the AL or "control" steps for the system. The data store may be the S3 system as shown. With respect to the WS component, custom docker images were build and AWS ECR repo or equivalent were used to store them. Then AWS step functions, AWS Training Jobs, AWS Lambda to do tasks, such as connecting to annotation service (ADAM), count iteration number to break the AL loop, and AWS inference or equivalent functions may be used to deploy the inference endpoints. The workflow component may be coupled over a computer network to an external grading service (ADAM), as shown, for example, over HTTP/REST.

The AL code may use indices of Pandas dataframes to run all aspects of AL code, i.e., 1) keeping track of uncertain examples based on their indices, 2) querying labels by using indices from step 1, and 3) adding labels for uncertain examples to training data based on indices/scores. For architecture using external services, file-based querying is preferred over index-based querying. To start, the full dataset may be split into seed and unlabeled dataset. If not labeled already, the seed dataset may be labeled. During iterations 0 (seed data training), the model is trained (as discussed herein) by the workflow component (computer(s)) using the labeled seed data, in at least one embodiment uncertain examples are found and removed from the unlabeled dataset, and the seed data, remaining unlabeled data, and data_to_be_annotated dataframes may be stored as pickle files in S3 data store. This ensures that for each iteration, the AWS Services, e.g., lambdas, can pick the data_to_be_annotated pickle files from S3, convert them into an ADAM compatible JSON, post them as tasks for ADAM, check if annotations have been completed, read tasks from ADAM, convert ADAM tasks to annotated_data dataframes so that it can be read in the next iterations by the workflow component, added to the "labeled" dataset, the model can be retrained (as discussed herein) based on this next dataset, and finally new uncertain examples found. The last created model may then be stored at the S3 system components and loaded in case RSs want to use for other applications or transfer learning.

In the AL iterations (x), the following steps may be performed by the workflow component computer(s): 1. Load labelled data from S3 data store; 2. Load annotated data of last batch from S3 data store; 3. Load unlabeled data from last batch from S3; 4. Load last trained model from S3 data store; 5. Add annotated data (from ADAM via AWS Services) to labelled data; 6. Train model based on new "labeled data" (and last model, if needed); 7. Use newly trained model to find uncertain examples and create file "data_to_be_annoated_batch_X"; 8. Upload updated labelled data file, unlabeled data, data_to_be_annotated, trained model to S3 data store; and 9. Store metrics/scores to S3 data store. The data_to_be_annotated may then be annotated using an external service that provides an interface for users/editors to annotate the data and return the annotations for integration back to S3 data store accordingly. This process is repeated for each AL iteration.

Figure 4:
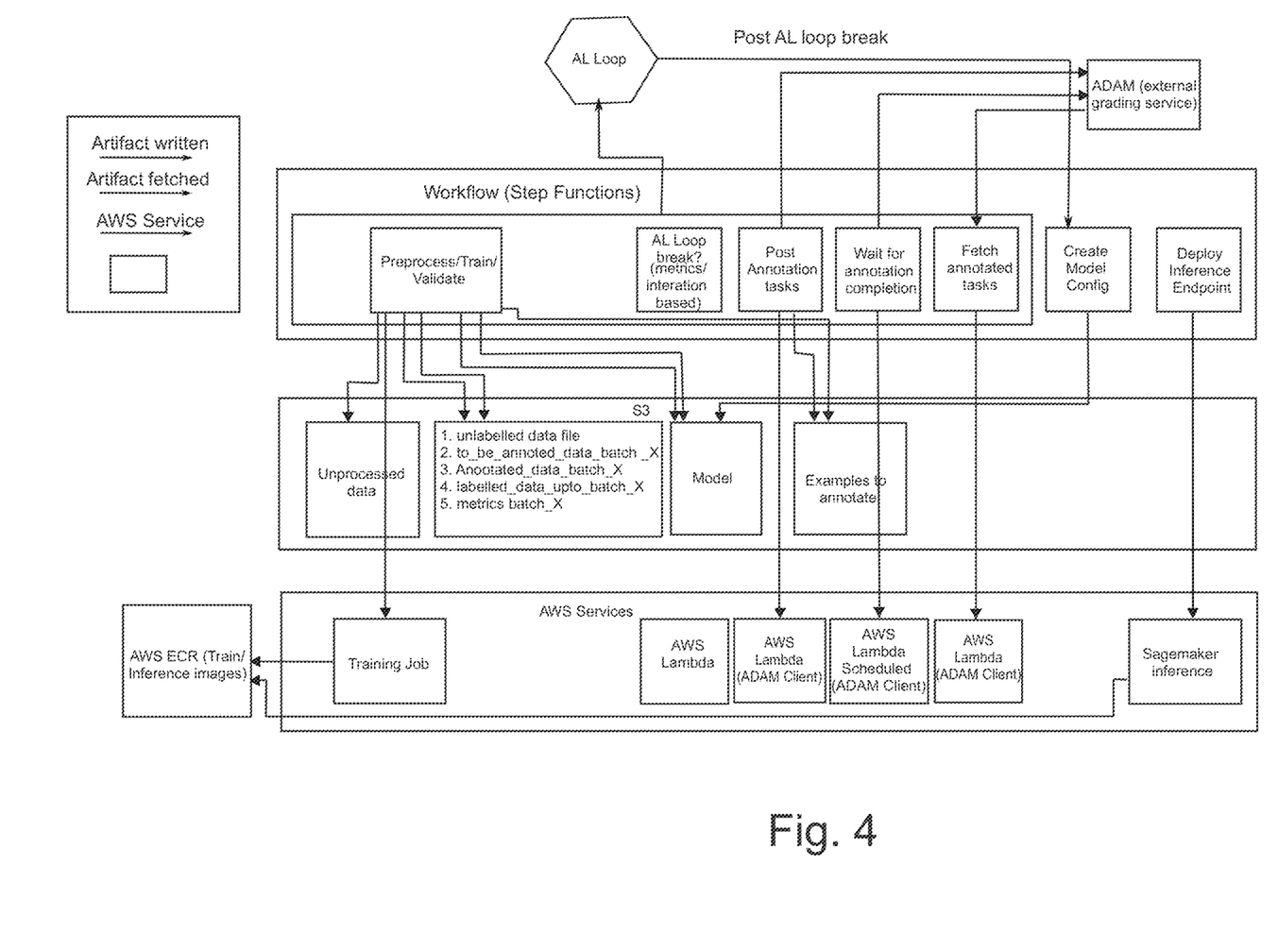
FIG. 4 is a flow diagram of a method for training a machine learning model in an active learning environment according to at least one embodiment of the methods disclosed herein.

Referring to FIG. 4, a method for training a machine learning model using training data, selected based on AL, CL, and/or ACL criteria, as discussed herein, may begin with obtaining a corpus of unlabeled data at 302. The corpus of unlabeled data may be a collection of thematically similar data for a given task. For example, for NLP tasks, such as name recognition or semantic similarly, databases such as Reuters's® CoNLL news article corpus, Camden content matching corpus, Microsoft Research Paraphrase Corpus (MRPC), etc. may be used. For contract analysis, Thomson Reuters® databases of legal agreements may be leveraged for the given task. For question and answers, a database of QA pairs relevant to the field of use, such as Quora Question Pairs (QQP), may be used. It is understood that various other collections of data may be used for training a model with respect to a specific task.

A "seed" data set may then be selected from the corpus at 304. The seed data is generally a relatively small subset of the corpus, which may be selected based on any or a variety of techniques. For example, the seed data set may be a random selection of data from the corpus or based on some other measure/score. The seed data may then be labeled at 306, which may be accomplished by expert human annotators or by a classification model trained to label the given data (single or multi-class labeling model). The labeled seed data may then be stored in a database of labeled data at 308 and such data may be used to train the machine learning model, including with respect to selecting the next training subset from the unlabeled dataset for model training at 310.

The next training subset may then be selected by the model at 312, labeled and/or sent to a labeling service, and once labeled stored in a database or data store at 316. As discussed herein, the model may be trained to select the next unlabeled data subset for annotation accounting for the AL score, CL score, or a combination thereof (ACL score) of the unlabeled or now labeled data. Scoring of the data may be achieved in a variety of ways. For example, the entire unlabeled dataset may be scored, and these metrics stored for use to identify data points for training a domain specific model. In one embodiment, a subset of the unlabeled dataset, such as a larger subset of the unlabeled data set, the seed data subset, and/or the next for annotation subset (which may each be a subset of the larger subset), may be scored, for example, at the time of selection of the given subset by the model. In another embodiment, scoring may be accomplished after the subset of data has been labeled. In any case, the score or any metric discussed herein may be calculated, stored in association with the respective data, and used to sort the unlabeled/labeled dataset and/or subset thereof at 314 before it can be used to train/refine the model. For example, the dataset/subset may be sorted based on informativeness, uncertainty, and/or any or a combination of curricula metrics discussed herein, or a combination thereof, including AL, CL, and/or ACL scores.

The labeled data may then be presented to train/retrain/fine tune the model in the order or sequence, for example, from the least to the most difficult at 318. At 320, a determination is made whether to repeat training/retraining/fine tuning the model, for example, based on a predetermined number of iterations or reaching a annotation budget. The training iteration steps 312-318 are repeated for the next training set, e.g., a predetermined number of items sorted based on difficulty (least to most difficult), as determined by the scores or metrics discussed herein, until stopped at 322. In the end, the system produces a model 1) able to identify data points for annotation, and 2) a labeled dataset, each exhibiting one or more of the benefits discussed herein of using the systems and methods of the present application.

Figure 5:
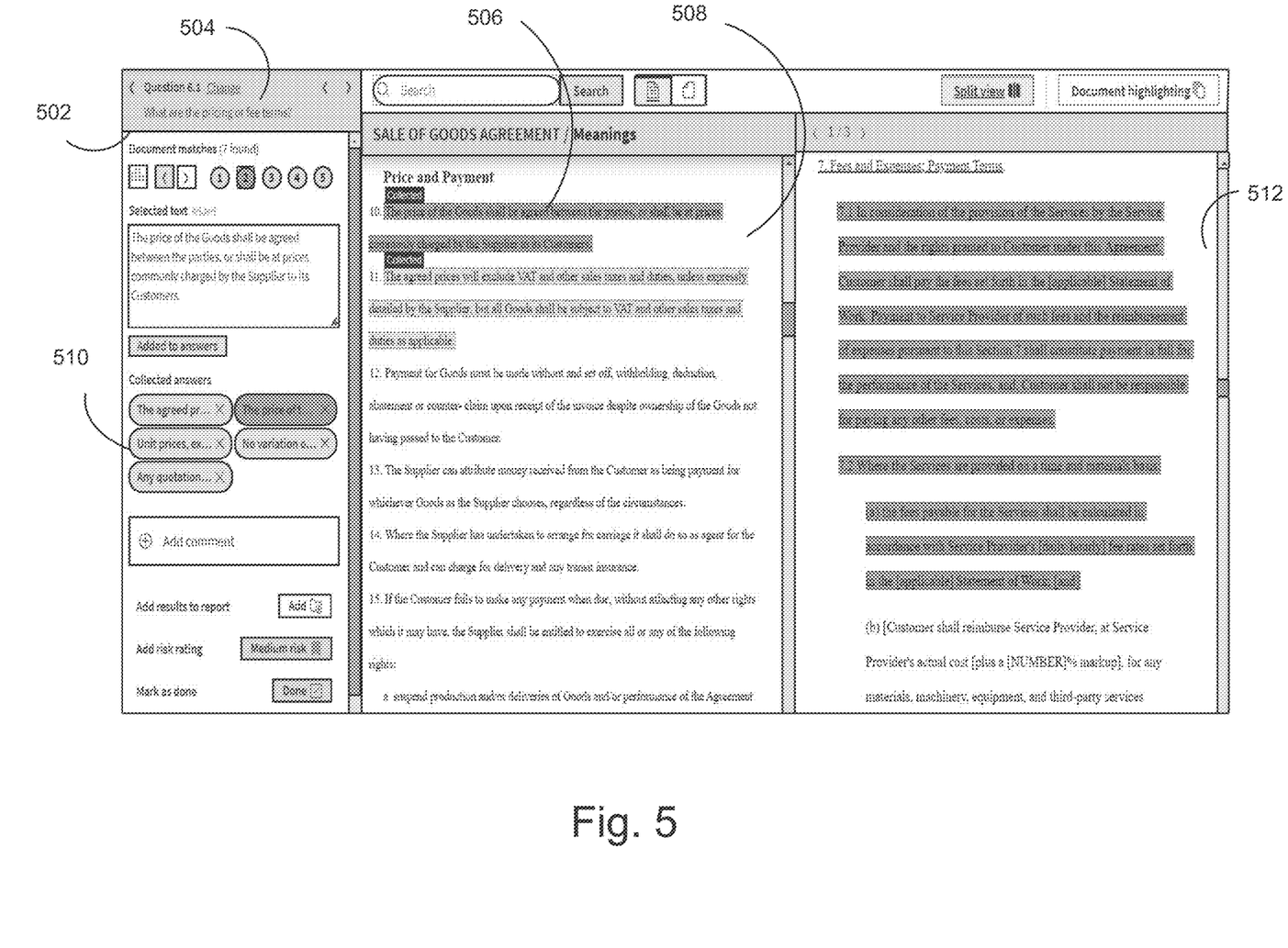
FIG. 5 depicts an exemplary interface of an application using the machine learning model trained in accordance with at least one of the embodiments of the methods disclosed herein.

The labeled dataset may be used to train one or more models to perform certain tasks, including NLP tasks, such as question answering, natural language understanding, content matching, named entity recognition, semantic similarity, text classification, etc. For example, the labeled data may be used to train a model for contract analysis. In this application, a dataset containing a plurality of contracts may be labeled, as taught herein, and one or more models trained using this dataset. Thereafter, an online product may be provided in which users are enabled to upload documents, such as a sale of goods agreement (as shown in FIG. 5) or any type of contract, to the service provider server computers for analysis by the trained model. The system allows users or a domain specific model is trained to automatically highlight certain language (clauses, sentences, phrases, etc.) from the contract, for the model to identify based thereon "questions" relevant to this language, and "answers" to such questions. The system may display the "questions" and "answers" in a side-by-side graphic presentation of the contract with the contract template or other contracts providing the answer, as shown in FIG. 5.

In one embodiment, the user interface includes a navigation window 502 which includes the "question" 504 relevant to the highlighted text 506. The interface is preferably configured for the user to select the text displayed in the contract window 508. Alternatively, or in addition, the system may automatically highlight text for the user to navigate through. The answers may also be navigated to by selecting an item from the list of answers 510, which when selected causes another window with the relevant text from the identified template or other contract highlighted 512. Various reporting tools may be provided, including adding a risk rating to the clause, notes, etc.

Other applications that may benefit from the models trained in accordance with this disclosure includes applications, for example, for legal analysis in which the model classifies types of motion, determining the procedural poster of a case, implied overruling of a case, document analysis, legal claims finder, tax answer machine, Westlaw® Edge, Practical Law ACE, E-Discovery Point (EDP), etc.

Figure 6:
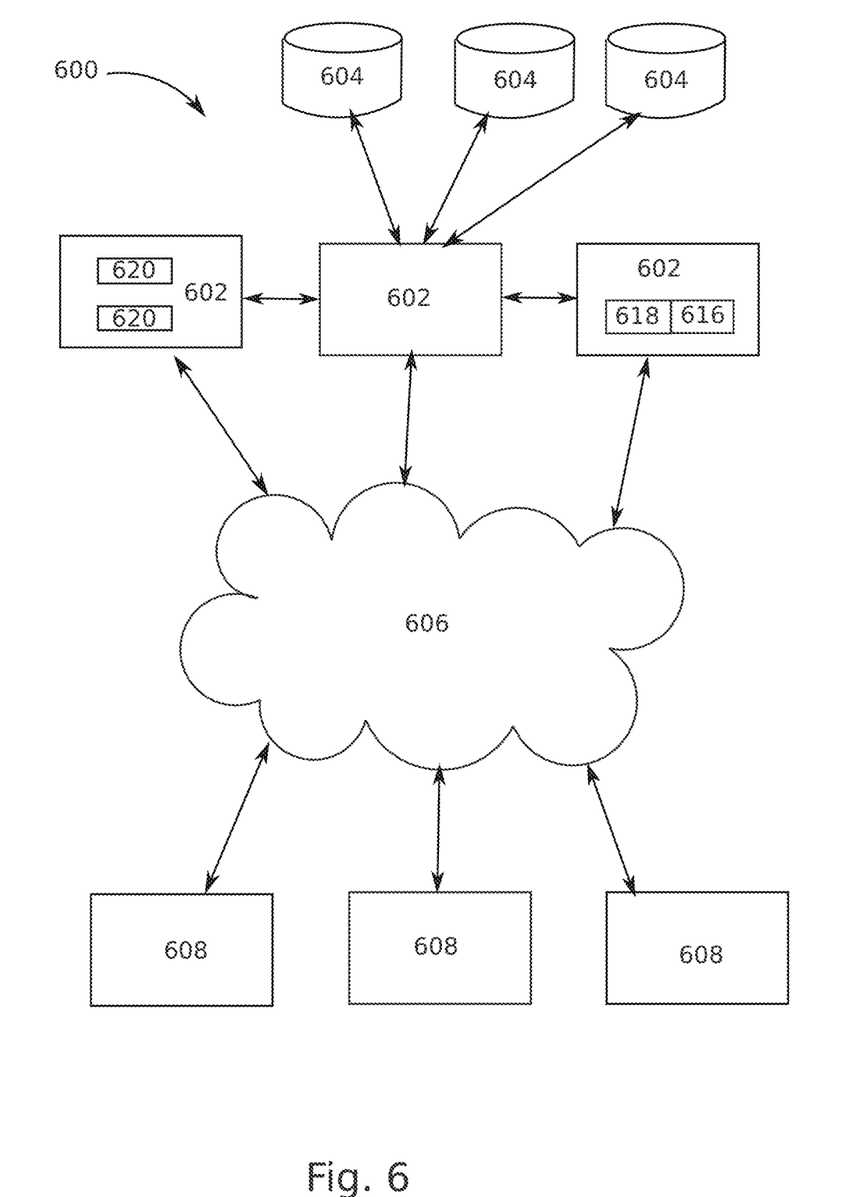
FIG. 6 a block diagram of a system for training a machine learning model in an active learning environment according to at least one embodiment of the systems disclosed herein.

FIG. 6 shows an exemplary system 600 configured to provide the functionality here is shown. In one embodiment, the system 600 includes one or more servers 602 (e.g., WS Services, ADAM, etc.), coupled to one or a plurality of databases/data stores 604 (e.g., S3) that store the data discussed herein. The servers 602 may further be functionally coupled over a communication network to one or more client devices 608. The servers 602 may also be communicatively coupled to each other directly or via the communication network 606.

The servers 602 may vary in configuration or capabilities but are preferably special-purpose digital computing devices that include at least one or more central processing units 616 and computer memory 618 configured to provide the functionality herein. The server(s) 602 may also include one or more of mass storage devices, power supplies, wired or wireless network interfaces, input/output interfaces, and operating systems, such as Windows Server, Unix, Linux, or the like. In an example embodiment, server(s) 602 include or have access to computer memory 618 storing instructions or applications 620 that when executed perform the various functions and processes disclosed herein, including training the model or models to identify unlabeled documents for annotation and applications that use documents labeled in accordance with the present disclosure. The servers may further include one or more search engines and a related interface component, for receiving and processing queries and presenting the results thereof to users accessing the service via client devices 604. The interface components generate web-based graphic user interfaces, as discussed herein.

The computer memory may be any tangible computer readable medium, including random access memory (RAM), a read only memory (ROM), a removable storage unit (e.g., a magnetic or optical disc, flash memory device, or the like), a hard disk, or etc.

The client devices 604 may include a personal computer, workstation, personal digital assistant, mobile telephone, or any other device capable of providing an effective user interface with a server and/or database. Specifically, client device 604 includes one or more processors, a memory, a display, a keyboard, a graphical pointer or selector, etc. The client device memory preferably includes a browser application for displaying interfaces generated by the servers 602 for interacting with the servers 602.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A computer implemented method for a training a machine learning model comprising:
    establishing an active learning machine learning model by:
        selecting seed data from an unlabeled dataset, wherein the seed data comprises a subset of the unlabeled dataset;
        labeling the seed data and storing the labeled seed data in a data store;
        training the active learning machine learning model in an initial iteration using the labeled seed data, wherein the active learning machine learning model is trained to select a next subset of the unlabeled dataset;
        analyzing by the active learning machine learning model a next plurality of subsets of the unlabeled dataset;
        computing one or more active learning informativeness scores for at least the next plurality of subsets of the unlabeled dataset;
        reducing a number annotations required to train the active learning machine learning model by selecting at least one subset of the plurality of subsets of the unlabeled data based on the one or more active learning informativeness scores;
    labeling the next subset of the unlabeled data; and
    introducing a curriculum learning machine learning model augmenting the established active learning machine learning model;
    computing one or more curriculum learning difficulty scores from the labeled next subset;
        training the active learning machine learning model in a second iteration using the labeled next subset of the unlabeled dataset, wherein the active learning machine learning model is trained to select the next subset of the unlabeled dataset for a subsequent training iteration by presenting the labeled next subset of the unlabeled dataset in an order sorted based on a linear combination of the one or more active learning informativeness scores and the one or more curriculum learning difficulty scores.

2. The method of claim 1, wherein the one or more curriculum learning difficulty scores are computed based on one or more curriculum learning metrics.

3. The method of claim 2, wherein the one or more active learning informativeness scores are computed further based on an active learning metric.

4. The method of claim 3, wherein the active learning metric comprises an uncertainty variable indicating uncertainty of label prediction for a given data item.

5. The method of claim 3, wherein the uncertainty variable includes at least two measures including a margin of prediction measure and an entropy of prediction measure.

6. The method of claim 2, wherein the labeled dataset comprises a plurality of sentences and wherein the one or more curriculum learning metrics comprises at least one of:
- an average of a number of children of words in a sentence parse tree,
- a sentence score according to the GPT2 language model, and
- average loss of words in a sentence according to the Longformer language model.

7. The method of claim 2, wherein the labeled dataset comprises a plurality of sentences, at least one word in each of a plurality of sentences is replaced with its linguistic feature, and wherein the one or more curriculum learning metrics comprises at least one of:
- simple universal part-of-speech tag,
- detailed part-of-speech tag,
- shape of the word, and
- syntactic relation connecting a child to a head in a dependency parsing tree of the given sentence.

8. The method of claim 2, wherein the linear combination creates an active curriculum score, the active curriculum score informing selection of a prospective unlabeled data set.

9. A computer system, comprising at least one server computer coupled over a computer network to at least one client device, the at least one server configured to:
- establishing an active learning machine learning model by:
  - receive labeled seed data from an unlabeled dataset and storing the labeled seed data in a data store, wherein the labeled seed data comprises a subset of the unlabeled dataset;
  - train the active learning machine learning model in an initial iteration using the labeled seed data, wherein the active learning machine learning model is trained to select a next subset of the unlabeled dataset;
  - analyze by the active learning machine learning model a next plurality of subsets of the unlabeled dataset;
  - compute one or more active learning informativeness scores for at least the next plurality of subsets of the unlabeled dataset;
  - reduce a number annotations required to train the active learning machine learning model by selecting at least one subset of the plurality of subsets of the unlabeled data based on the one or more active learning informativeness scores;
  - receive the next subset of the unlabeled data labeled; and
- introduce a curriculum learning machine learning model augmenting the established active learning machine learning model;
- compute one or more curriculum learning difficulty scores from the labeled next subset;
- train the active learning machine learning model in a second iteration using the labeled next subset of the unlabeled dataset, wherein the active learning machine learning model is trained to select the next subset of the unlabeled dataset for a subsequent training iteration by presenting the labeled next subset of the unlabeled dataset in an order sorted based on a linear combination of the one or more active learning informativeness scores and the one or more curriculum learning difficulty scores.

10. The system of claim 9, wherein the one or more curriculum learning difficulty scores are computed based on one or more curriculum learning metrics.

11. The system of claim 10, wherein the one or more active learning informativeness scores are computed further based on an active learning metric.

12. The system of claim 11, wherein the active learning metric comprises an uncertainty variable indicating uncertainty of label prediction for a given data item.

13. The system of claim 11, wherein the uncertainty variable includes at least two measures including a margin of prediction measure and an entropy of prediction measure.

14. The system of claim 10, wherein the labeled dataset comprises a plurality of sentences and wherein the one or more curriculum learning metrics comprises at least one of:
- an average of a number of children of words in a sentence parse tree,
- a sentence score according to the GPT2 language model, and
- average loss of words in a sentence according to the Longformer language model.

15. The system of claim 10, wherein the labeled dataset comprises a plurality of sentences, at least one word in each of a plurality of sentences is replaced with its linguistic feature, and wherein the one or more curriculum learning metrics comprises at least one of:
- simple universal part-of-speech tag,
- detailed part-of-speech tag,
- shape of the word, and
- syntactic relation connecting a child to a head in a dependency parsing tree of the given sentence.

16. The system of claim 10 the linear combination creates an active curriculum score, the active curriculum score informing selection of a prospective unlabeled data set.

17. The system of claim 9, the at least one server configured to:
- store unlabeled data, labeled data, and the machine learning model in a remote data store,
- for each iteration, download the unlabeled data, the labeled data, and the active learning machine learning model for training, and
- upon completion of training, upload resulting unlabeled data, labeled data, and the trained machine learning model to the data store.

18. The system of claim 17, the at least one server configured to: communicate the next subset of the unlabeled dataset to an annotation service, check annotation status, and retrieve from the annotation services the labeled next subset of the unlabeled dataset.

19. The system of claim 18, wherein the system comprises a workflow component that controls training of the active learning machine learning model and a web service component that comprises at least one service that picks a file from the datastore containing data to be annotated, post the data to be annotated as tasks in the annotation service, check annotation status, and read tasks from the annotation service.

20. The system of claim 19, the at least one service further converts the tasks from the annotation service to annotated data dataframes for the workflow component to read the annotated data dataframes for iterative training of the active learning machine learning model.

* * * * *